(No Model.) 2 Sheets—Sheet 1.
G. W. LEWIN.
REGISTERING DYNAMOMETER.
No. 560,271. Patented May 19, 1896.
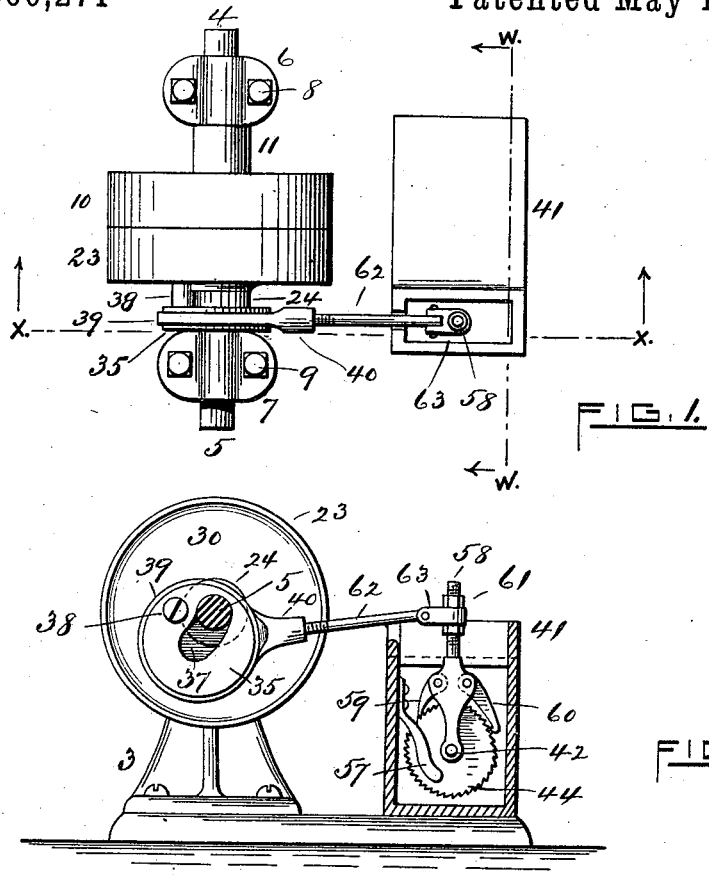
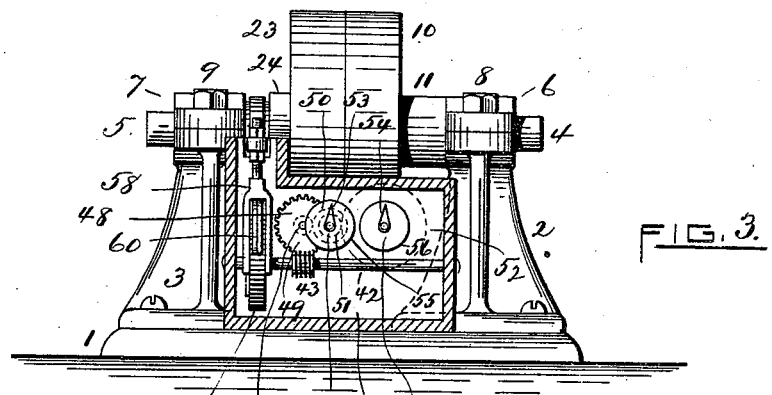
WITNESSES: INVENTOR,
Charles T. Hannigan. George W. Lewin
A. E. Pirce. by Warren R. Perce
Atty.

(No Model.) 2 Sheets—Sheet 2.
G. W. LEWIN.
REGISTERING DYNAMOMETER.
No. 560,271. Patented May 19, 1896.
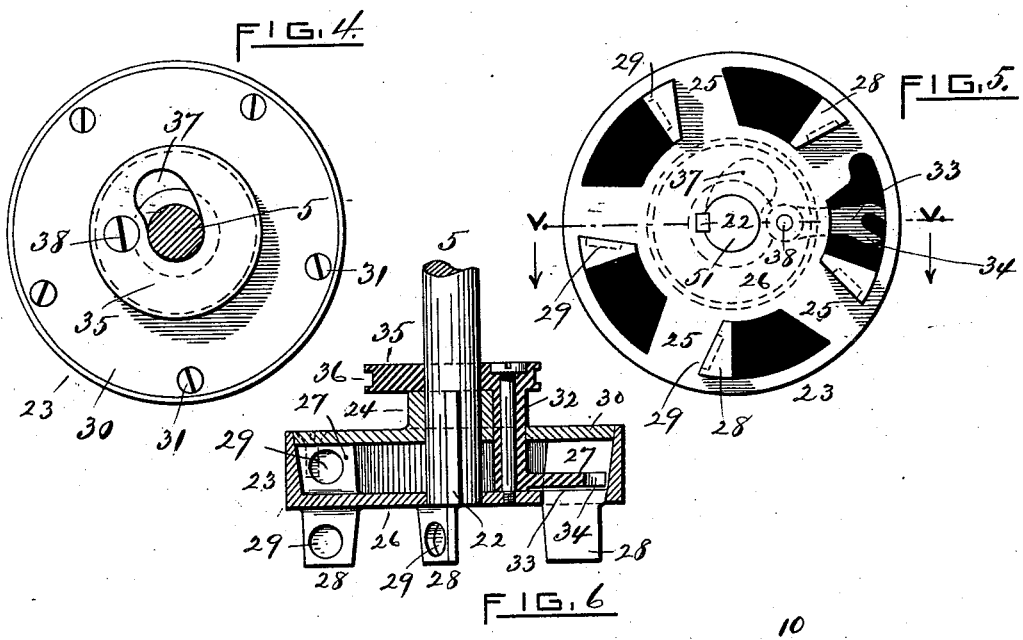
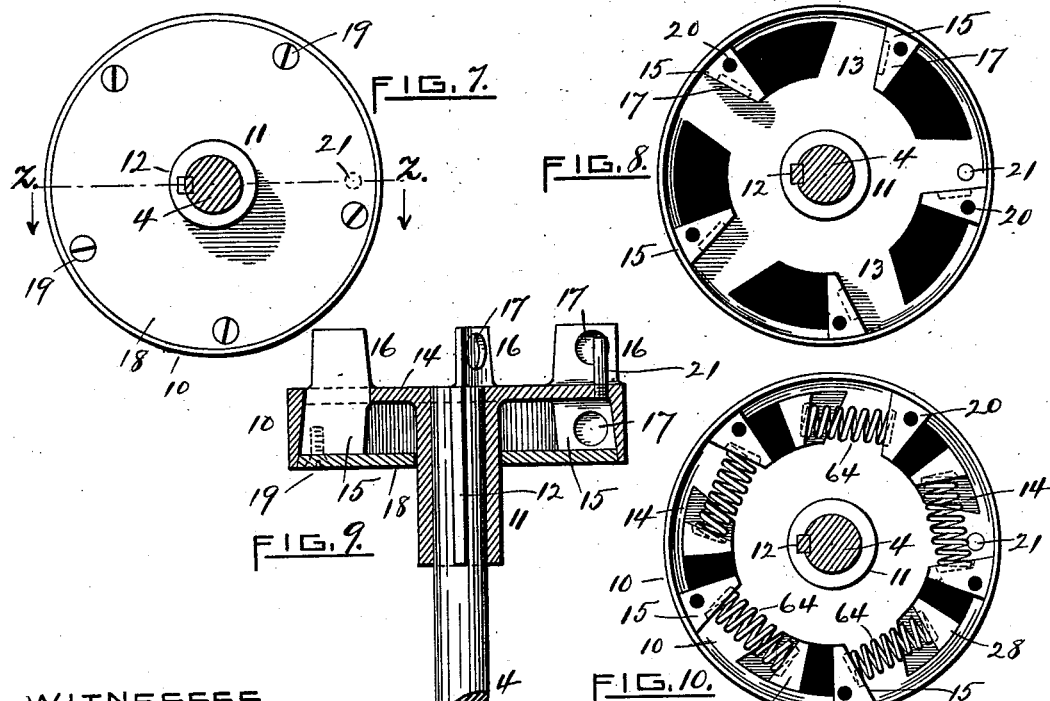
WITNESSES.
Charles T. Hannigan.
A. E. Perce.
INVENTOR:
George W. Lewin
By Warren R. Perce
Atty.

UNITED STATES PATENT OFFICE.

GEORGE W. LEWIN, OF FALL RIVER, MASSACHUSETTS.

REGISTERING-DYNAMOMETER.

SPECIFICATION forming part of Letters Patent No. 560,271, dated May 19, 1896.

Application filed December 23, 1895. Serial No. 572,971. (No model.)

*To all whom it may concern:*

Be it known that I, GEORGE W. LEWIN, of Fall River, in the county of Bristol, in the State of Massachusetts, have invented a new and useful Improvement in Registering-Dynamometers; and I declare the following to be a specification thereof, reference being had to the accompanying drawings.

Figure 1 is a top plan view of my invention. Fig. 2 is a view of the same, partly in side elevation and partly in section, on line $x\,x$ of Fig. 1. Fig. 3 is a view of the same, partly in front elevation and partly in section, on line $w\,w$ of Fig. 1. Fig. 4 is a side elevation of the outer and cam-slotted plates of the resistance-coupling. Fig. 5 is a plan view of said resistance-coupling in a position reverse to that shown in Fig. 4. Fig. 6 is a sectional view of said coupling, as seen on line $v\,v$ of Fig. 5, with the shaft, pin, and radial arms in elevation. Fig. 7 is a plan view of the outer plate of the driving-coupling. Fig. 8 is a plan view of the interior of said driving-coupling after the plate has been removed therefrom. Fig. 9 is a sectional view of the driving-coupling, as seen on line $z\,z$ of Fig. 7, with the shaft and radial arms in elevation. Fig. 10 is a plan view showing the interior of said resistance-coupling and driving-coupling, (after the plate last aforesaid has been removed,) with the shaft in cross-section and the springs in elevation.

Like numerals indicate like parts.

My invention relates to the class of dynamometers, and is intended to measure and register the power exerted by a shaft rotated by a steam-engine or other prime motor. The present modes of ascertaining the amount of power at the very instant of its use are inadequate, inaccurate, and are very largely dependent upon conjecture, while, so far as I know, there has never, hitherto, been any device adapted to register the amount of power which has been previously used.

My invention consists of two abutting shafts, each having a coupling, which couplings are arranged to lie in contact with each other and are provided with springs, interposed between the radial arms of one coupling and the radial arms of the other coupling, and a connecting-lever from one to the other, adapted to compress said springs, an eccentrically-mounted arm connected with said lever and deriving a reciprocating movement therefrom, and a registering device, operated by the arm last aforesaid, as hereinafter particularly described.

In the drawings, 1 represents the bed or base of the machine, and 2 3 are the standards or hangers erected thereon. The main shaft 4 is mounted on the standard or hanger 2, in a groove thereof, and 5 is also a shaft, mounted on the standard or hanger 3, in a groove thereof. Cap-pieces 6 7 cover the ends of the shafts 4 and 5, respectively, being secured in place by the bolts 8 8 9 9. The shaft 4 carries a coupling 10, which I will designate as the "driving-coupling" of my device. The coupling 10 has a hub 11, and a spline or key 12, fitting into corresponding longitudinal grooves in the shaft 4 and in the bore of said hub 11, secures the coupling 10 to the shaft 4. The coupling 10 consists of said hub 11 and a circular rim, having radial arms 13, integral therewith and extending therefrom inwardly until they unite in a central circular plate or web 14, as fully illustrated in Fig. 9. From the radial arms 13 extend lugs 15 16, inwardly and outwardly, as shown in Fig. 9. In each lug there is a shallow socket 17. A face-plate 18 constitutes the outer side of the coupling 10, being attached thereto by screws 19, which enter holes 20 in the lugs 15, respectively. A pin 21 extends from one of the radial arms 13, as shown in Fig. 9 in elevation and in top plan in Figs. 8 and 10, and in dotted lines in Fig. 7.

On the shaft 5 is fastened, by a spline 22, a coupling 23, which I designate as the "resistance-coupling" of my device. This coupling has a hub 24, a circular rim, and radial arms 25, integral therewith and extending inwardly therefrom until they unite in a central circular plate or web 26, as illustrated in Fig. 6. From the radial arms 25 extend lugs 27 28, outwardly and inwardly, as shown in Fig. 6. In each lug there is a socket 29. A face-plate 30 constitutes the outer side of the coupling 23, being attached thereto by screws 31, which enter holes in the lugs 27, respectively. A tubular barrel or sleeve 32 has at one end a lever-arm 33, with a head or enlargement at its outer end, where there is provided an angularly-directed slot 34, and at the other end a circular plate or disk 35, made with a circumferential groove or channel 36 and a curved radial slot 37, of an aperture or width equal to the diameter of the shaft 5. The ends of said slot 37 are semicircular, formed in the same arc as the circumference of the shaft 5. The face-plate has a hole sufficient to allow the passage of the sleeve 32 through it. A headed pin 38 passes through the disk 35 and the sleeve 32 and by means of a screw-thread at its end is fastened to the central circular plate 26 of the coupling 23. The circular plate or disk 35 is normally in a position concentric with the coupling 23, as shown in Fig. 4, but is capable of an eccentric position, the utmost extent of which eccentricity is shown in Fig. 2. This variation of the position of the disk 35 is accomplished by means hereinafter specified; but its oscillation is always upon the fixed pin 38, by which it is mounted upon the coupling 23.

Upon the periphery of the circular plate or disk 35, in the channel or circumferential groove 36 thereof, is loosely mounted a ring 39, having an extension or boss 40.

A box or case 41 contains the registering mechanism. This consists of a shaft 42, mounted in the case 41, and having a worm-gear 43 thereon. At the end of the shaft 42 is a ratchet-wheel 44. There are three cross-shafts 45 46 47 shown in Fig. 3. On the cross-shaft 45 is the cogged wheel 48, engaging with the worm-gear 43, and also the pinion 49. This pinion engages with a cog-wheel 50 upon the shaft 46, on which shaft is also a pinion 51. The pinion 51 engages with the cog-wheel 52 upon the shaft 47. At the end of the shaft 46 is the index 53, and on the end of the shaft 47 is the index 54. Dials 55 and 56, properly marked, enable the reading of the position of the indexes 53 and 54 thereon, respectively. A spring 57, fastened to the case 41, has its free end bearing against the face of the ratchet-wheel 44. A vibrating arm 58, having a transverse enlargement, (shown in Fig. 2,) is pivoted loosely on the shaft 42 and carries two pawls 59 60, pivotally mounted on said enlarged portion of the vibrating arm 58 and engageable with the ratchet-teeth of the wheel 44. The upper end of the arm 58 is screw-threaded to admit of the proper adjustment thereon of a collar or sleeve 61. The vibrating arm 58 is bifurcated, as seen in Fig. 3, to lie on both sides of the ratchet-wheel 44. A link bar or rod 62, having a screw-threaded end, is secured in the boss 40 of the ring 39, and at its opposite end is pivotally connected with earpieces 63, extending from the collar or sleeve 61.

The couplings 10 and 23 are placed together, as illustrated in Fig. 10, with spiral springs 64 between the lugs 15 28 16 27, respectively, seated in the sockets of said lugs, as shown. The slotted end 34 of the lever-arm 33 in the coupling 23 is engaged with the fixed pin 21 of the coupling 10. The inner ends of the shafts 4 and 5 abut each other. Power applied to the shaft 4 by a pulley or otherwise causes said shaft to rotate. This rotation causes the fixed pin 21 of the coupling 10 to press on the lever-arm 33 of the resistance-coupling 23 and to turn said lever from its true radial direction (shown in Fig. 5) to a more or less angular position, thereby producing two results: first, the compression of the spiral springs between the lugs 15 28, respectively, until the resistance of said springs equals the power which rotates the coupling 10 and shaft 4, after which, said power and resistance being equal, the couplings 10 23 and shafts 4 5 rotate together, and, secondly, the angular divergence of the lugs, caused by said compression of the springs, communicates a corresponding motion to the lever-arm 33 of the coupling 23 equal in degree to the angular divergence of the lugs 15 28, as aforesaid. This movement of the lever-arm 33 turns to the same degree the sleeve 32 upon the pin 38 and also the circular disk 35, so that said disk is no longer concentric with the coupling 23 and shaft 5, as before, but is oscillated upon the pin 38 and becomes eccentrically positioned by reason of the curvature of the slot 37 with reference to the shaft 5. As long as the circular disk 35 remains concentric with said shaft 5 and coupling 23 the link-bar 62 does not move, but said disk 35 simply turns within the ring 39; but as soon as the disk 35 becomes eccentric with relation to the shaft 5 and coupling 23 the link-bar 62 is given a reciprocating movement backward and forward, to a greater or less extent, exactly proportioned to the angular divergence of the lugs 15 28, respectively, of the couplings 10 23 caused by the compression of the springs 64, as already described. This reciprocating movement of the link-bar 62, whatever its degree, is communicated at every revolution of the shaft 5 by said bar or rod 62 to the vibrating arm 58, with which said bar 62 is pivotally connected.

The vibration of the arm 58 causes, by means of its pawls 59 60, a corresponding movement of rotation in the ratchet-wheel 44. The wheel 44 is advanced by the forward movement of the vibrating arm 58, but is held firm against a return movement by the friction or pressure of the spring 57 upon its face. The rotation of the ratchet-wheel 44 turns the main shaft 42, to which it is fastened, and with it the worm-gear 43. The rotation of the worm-gear 43 turns the cog-wheel 48 and pinion 49 on the cross-shaft 45, and said pinion 49 turns the cog-wheel 50 and pinion 51 on the cross-shaft 46, and the pinion 51 turns the cog-wheel 52 on the shaft 47. The shaft 46 carries the index 53 around the dial 55 and the shaft 47 carries the index 54 around the dial 56. Every rotation of the coupling 23, therefore, whenever the disk 35 is eccentrically positioned on said coupling, causes the link-bar 62 to move reciprocally and thereby to vibrate the arm 58, which movement, being communicated by the train of gearing, causes the indexes to advance over the dials, respectively.

In further explanation of the operation of my device, for the sake of simplicity, I will suppose the couplings to be twelve inches in circumference and that the power or tension of the springs 64 is such as to resist a total amount of five hundred and fifty pounds or a leverage of one and twenty-nine thirty-seconds inches, which is the radius of a circle whose circumference is twelve inches. As one horse-power is a force which raises thirty-three thousand pounds twelve inches in one minute, it would be equivalent to a force which raises five hundred and fifty pounds twelve inches in one second, or in one hour (equal to three thousand six hundred seconds) it would raise thirty-three thousand pounds sixty feet. Therefore, when the parts are properly adjusted, three thousand six hundred revolutions of the couplings in one hour will indicate one horse-power if the springs constantly resist five hundred and fifty pounds and if the disk 35 is at its extreme of eccentricity, (illustrated in Fig. 2,) while any less degree of said eccentricity will require a proportionately greater number of revolutions—that is to say, if the link-bar 62 is reciprocated to its fullest extent the vibrating arm 58 will be correspondingly moved, so that three thousand six hundred reciprocations of the link-bar 62 will result in three thousand six hundred full vibrations of the arm 58 and the index 53 will make one circuit on the dial 55, and will thereby indicate that one horse-power has been used; but any less eccentricity of the disk 35 will correspondingly shorten the reciprocating movement of the link-bar 62 and a correspondingly greater number of reciprocations of said bar and of vibrations of the arm 58 will be required to move the index 53 around the dial. When, however, said index has completed one circuit around the dial, at whatever rate or speed, it shows the expenditure of one horse-power.

By the gearing shown ten circuits of the index 53 on its dial 55 will cause one circuit of the index 54 on its dial 56, and so other gearing, on the same scale, will show on respective dials the hundreds and thousands of horse-power used, and so on, as far as it may be desired to increase the number of dials and indexes.

As the essential idea of my invention is a train of gears in a registering device, operated progressively by a vibrating arm, in combination with a reciprocating bar, moved by an eccentrically-mounted disk or wheel, when such eccentricity is caused by the angular divergence of the corresponding parts of a driving-coupling and of a resistance-coupling, I do not wish to confine myself to the precise details of construction shown; but I claim any combination of mechanical devices accomplishing such reciprocating movement of a bar to operate the vibrating arm of a registering device.

I claim as a novel and useful invention and desire to secure by Letters Patent—

1. In a dynamometer, the combination of a registering device, having a vibrating arm, a bar adapted to vibrate said arm and mounted at one end upon a resistance-coupling eccentrically thereto, a shaft to which said coupling is fastened, a second shaft, located with its end abutting the end of the shaft first mentioned and having a driving-coupling fastened thereon, a series of springs mounted upon said couplings, respectively, and means adapted to connect said couplings and to vary the eccentricity of the mounting of said bar in proportion to the degree of the compression of said springs, substantially as described.

2. In a dynamometer, the combination of two shafts properly mounted and having their ends abutting each other, means for rotating one of said shafts by power, a spring or series of springs secured at one end to supports fixed upon the shaft last aforesaid and at the other end to supports fixed upon the other of said shafts, which springs are adapted first to be compressed until their resistance is equal to the power applied to the driving-shaft and then to communicate the power from the first shaft to the second shaft to rotate the latter, a bar pivotally mounted on the fixed supports of the second shaft, but eccentric thereto and adapted to have a variable reciprocating movement by means extending from the fixed supports of the driving-shaft to the fixed supports of the other shaft and movable in proportion to the angular divergence of said supports from each other, and a registering device having a vibrating arm adapted to be operated by said eccentrically-mounted bar, substantially as shown.

3. In a dynamometer, the combination of the shafts 4, 5, properly mounted with their ends abutting, the driving-coupling 10, mounted on the shaft 4, and provided with the hub 11, the central web 14, the radial arms 13, and the lugs 15 and 16, on said radial arms and having the pin 21, the resistance-coupling 23, mounted on the shaft 5, and provided with the hub 24, the central web 26, the radial arms 25, and the lugs 27, 28, on said arms and having the lever-arms 33, with a slotted end, the sleeve 32, and the circular channeled disk 35, made with the curved slot 37, therein, the pins 38, on which said lever-arm 33, sleeve 32 and disk 35, are mounted, the springs 64, seated in the lugs 15, 28, 16, 27, respectively, as shown, the ring 39, mounted on the disk 35 and having the boss 40, the link-bar 62, mounted in said boss, the vibrating arm 58 connected pivotally with the bar 62 and the train of gearing adapted to be operated by said vibrating arm and provided with indexes and dials, all arranged and operating substantially as and for the purposes specified.

GEORGE W. LEWIN.

Witnesses:
JAMES M. MORTON, Jr.,
EDW. A. THURSTON.